United States Patent
Hu et al.

(10) Patent No.: US 11,820,212 B2
(45) Date of Patent: Nov. 21, 2023

(54) FRONT CONNECTING ROD FOR SUNROOF LINKAGE, SUNROOF LINKAGE AND SUNROOF ASSEMBLY

(71) Applicant: Webasto SE, Stockdorf (DE)

(72) Inventors: Jerry Hu, Shanghai (CN); Fisher Yu, Shanghai (CN); Sulzer Zhu, Shanghai (CN); Andreas Zunzer, Munich (DE); Maximilian Ehrmann, Dietramszell (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 17/778,292

(22) PCT Filed: Dec. 16, 2020

(86) PCT No.: PCT/EP2020/086487
§ 371 (c)(1),
(2) Date: May 19, 2022

(87) PCT Pub. No.: WO2021/130082
PCT Pub. Date: Jul. 1, 2021

(65) Prior Publication Data
US 2022/0410677 A1    Dec. 29, 2022

(30) Foreign Application Priority Data
Dec. 27, 2019   (CN) .......................... 201922393362.2

(51) Int. Cl.
*B60J 7/057* (2006.01)
*B60J 7/043* (2006.01)

(52) U.S. Cl.
CPC ............... *B60J 7/057* (2013.01); *B60J 7/043* (2013.01); *B60J 7/0435* (2013.01)

(58) Field of Classification Search
CPC ......... B60J 7/0435; B60J 7/057; B60J 7/0573
(Continued)

(56) References Cited

U.S. PATENT DOCUMENTS 7,828,376 B2 * 11/2010 Nellen ................... B60J 7/0435
296/216.03

FOREIGN PATENT DOCUMENTS

CN   208827562 U  *  5/2019 .............. B60J 7/043
CN   110370903 A  *  10/2019 ........... B60J 7/0435
(Continued)

OTHER PUBLICATIONS

International Search Report for PCT/EP2020/086487 dated Mar. 22, 2021, in English and Written Opinion (13 pages in English).

*Primary Examiner* — Dennis H Pedder
(74) *Attorney, Agent, or Firm* — Fitch, Even, Tabin & Flannery, LLP

(57) ABSTRACT

A front connecting rod for a sunroof linkage, a sunroof linkage, and a sunroof assembly. The sunroof linkage is configured to drive front glass of a sunroof assembly to slide relative to rear glass, and the front connecting rod is configured to connect a glass-supporting rod of the sunroof linkage to a front slider. The front connecting rod may have an anti-turn-over structure, configured to be matched in shape to a sealing strip disposed on a peripheral edge of the rear glass, so as to prevent the sealing strip from turning over when the sunroof linkage drives the front glass to slide. The front connecting rod for a present sunroof linkage enables a sunroof to open to the maximum extent, and during sliding will not cause the sealing strip of the rear glass to be turned over and folded.

3 Claims, 2 Drawing Sheets

(58) Field of Classification Search
USPC .......................................................... 296/223
See application file for complete search history.

(56) References Cited

FOREIGN PATENT DOCUMENTS

| | | | | |
|---|---|---|---|---|
| DE | 10237543 B4 * | 2/2005 | ............ | B60J 7/0435 |
| DE | 102016125923 A1 | 7/2018 | | |
| KR | 101607085 B1 * | 3/2016 | .............. | B60J 7/057 |

* cited by examiner

FRONT CONNECTING ROD FOR SUNROOF LINKAGE, SUNROOF LINKAGE AND SUNROOF ASSEMBLY

CROSS-REFERENCE TO RELATED APPLICATION

This application is a U.S. national phase application filed under 35 U.S.C. § 371 of International Application No. PCT/EP2020/086487, filed Dec. 16, 2020, designating the United States, which claims priority from China Patent Application Number 201922393362.2 filed on Dec. 27, 2019, which is hereby incorporated herein by reference in its entirety for all purposes.

TECHNICAL FIELD

The present invention relates to the technical field of vehicle sunroofs. In particular, the present utility model relates to a front connecting rod for a sunroof linkage. The present invention further relates to a sunroof linkage comprising such a front connecting rod, and a sunroof assembly comprising such a sunroof linkage.

BACKGROUND ART

At present, openable transparent sunroofs are installed in the roofs of the vast majority of household vehicles, for the purposes of ventilation, lighting and heat dissipation, etc. These openable transparent sunroofs generally comprise a sunroof frame, front glass and rear glass; the front glass is installed at a front part of the sunroof frame and is slidable rearwards, the rear glass is installed at a rear part of the sunroof frame, and guide rails for the front glass and linkage sliders of a roller blind mechanism to slide along are formed at left and right sides of the sunroof frame. In addition, sealing strips are provided at the peripheries of the front glass and rear glass or on their own structures.

FIG. 1 is a partial schematic drawing of a sunroof linkage in the prior art; FIG. 2 is a partial schematic drawing of the sunroof linkage in FIG. 1 when in contact with a sealing strip 5 of rear glass 6. The linkage is a linkage for driving front glass to slide; a sliding mechanism of the linkage mainly comprises a glass-supporting rod 3, a front connecting rod 100, a front slider 4, a rear connecting rod 2 and a rear slider (not shown). The glass-supporting rod 3 is configured to secure the front glass (not shown); for example, the glass-supporting rod 3 is provided with a hole 31, through which a screw can pass to secure the front glass. The front slider 4 and rear slider are configured to slide in guide rails of a sunroof frame, in order to drive the front glass to slide relative to the rear glass via the sliding of the linkage, and thereby achieve the opening and closing of the sunroof. The front connecting rod 100 is configured to connect a front end of the glass-supporting rod 3 to the front slider 4, and the rear connecting rod 2 is configured to connect a rear end of the glass-supporting rod 3 to the rear slider, wherein the front connecting rod 100 has a substantially triangular shape as shown in the figure.

SUMMARY OF THE INVENTION

With regard to the substantially triangular front connecting rod 100 mentioned above, the applicant has found that when the linkage drives the front glass to slide rearwards above the rear glass 6, an oblique edge 101 thereabove will strike a lateral front end 51 of the sealing strip 5 of the rear glass 6, and if at this time the linkage continues to drive the front glass to slide rearwards, the oblique edge 101 of the front connecting rod 100 will push up the sealing strip 5, causing the sealing strip 5 to turn over and deform to a considerable degree; this will result in the sealing strip 5 producing abnormal noises when turning over and springing back, and will result in damage to the sealing strip 5 after multiple uses, thereby affecting the service life. Thus, a front end of the front glass generally cannot be designed so as to be flush with a front end of the rear glass in a longitudinal direction of the vehicle when the sunroof is fully open, and the result is that the sunroof cannot be opened to the maximum extent.

An object of the present invention is to improve the structure described above, by providing a front connecting rod for a sunroof linkage, a sunroof linkage comprising such a front connecting rod, and a sunroof assembly comprising such a sunroof linkage; the front connecting rod for a sunroof linkage according to the present invention enables a sunroof to open to the maximum extent, and during sliding will not cause a sealing strip of rear glass to be turned over and folded, thereby increasing the service life of the sealing strip, and avoiding abnormal noises caused by the sealing strip turning over and springing back.

To this end, a first aspect of the present invention provides a front connecting rod for a sunroof linkage, the sunroof linkage being configured to drive front glass of a sunroof assembly to slide relative to rear glass, and the front connecting rod being configured to connect a glass-supporting rod of the sunroof linkage to a front slider; the front connecting rod comprises an anti-turn-over structure, configured to be matched in shape to a sealing strip disposed on a peripheral edge of the rear glass, so as to prevent the sealing strip from turning over when the sunroof linkage drives the front glass to slide.

According to a preferred embodiment of the present invention, the anti-turn-over structure is a recess formed on an edge of the front connecting rod that faces the sealing strip.

According to a preferred embodiment of the present invention, an included angle formed by a recessed edge of the recess is less than or equal to 90°.

According to a preferred embodiment of the present invention, the rear glass is securely installed at a rear part of a frame of the sunroof, or is configured to be inclinable by a predetermined angle.

A second aspect of the present invention provides a sunroof linkage, comprising: a glass-supporting rod, configured to be securely connected to front glass; a front slider, configured to slide in a guide rail of a sunroof assembly; and the front connecting rod for a sunroof linkage according to the first aspect of the present invention, connecting the glass-supporting rod to the front slider.

A third aspect of the present invention provides a sunroof assembly, comprising: a sunroof frame; front glass, slidably installed at a front part of the sunroof frame; rear glass, the rear glass being installed at a rear part of the sunroof frame, and a peripheral edge of the rear glass being provided with a sealing strip; and the sunroof linkage according to the second aspect of the present invention, for driving the front glass to slide.

Compared with the prior art, the front connecting rod for a sunroof linkage according to the present invention has multiple advantages, in particular the following: Due to the recessed design of the front connecting rod, when the linkage drives the front glass to slide rearwards, a front end of the front glass and a front end of the rear glass can be flush with each other in a longitudinal direction of a vehicle, to enable the sunroof to open to the maximum extent, and the sealing strip of the rear glass will substantially not be pushed up by the front connecting rod and thereby turned over and folded, and therefore will not produce abnormal noises caused by turning over and springing back, and has a longer service life. In addition, the front connecting rod is structurally simple, low in cost, convenient to manufacture, and can be widely used in various types of sunroof linkage.

BRIEF DESCRIPTION OF THE DRAWINGS

A better understanding of other features and advantages of the present invention will be gained through the preferred embodiments described in detail below in conjunction with the drawings, in which identical reference labels indicate identical or similar components.

DETAILED DESCRIPTION

Figure 1:
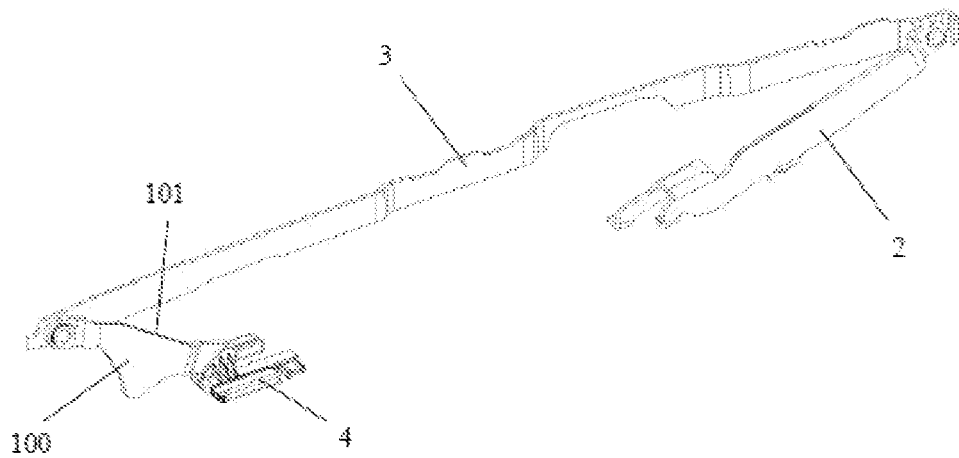
FIG. 1 is a partial schematic drawing of a sunroof linkage in the prior art.

The implementation and use of embodiments are discussed in detail below. However, it should be understood that the particular embodiments discussed merely demonstratively illustrate specific ways of implementing and using the present invention, without limiting the protection scope of the present invention.

As used herein, directional expressions such as "up", "down", "front", "rear", "left" and "right" are not absolute. In the drawings, the front of a vehicle is at the left, and the rear of the vehicle is at the right. These directional expressions are appropriate when the various components are arranged as shown in the figures, but when the positions of the various components in the figures change, these directional expressions will also change accordingly. Moreover, the sliding mechanism of the linkage shown is a sliding mechanism located at the left side of the front glass; a sliding mechanism at the right side has the same operating principles, and therefore is not shown.

Figure 2:
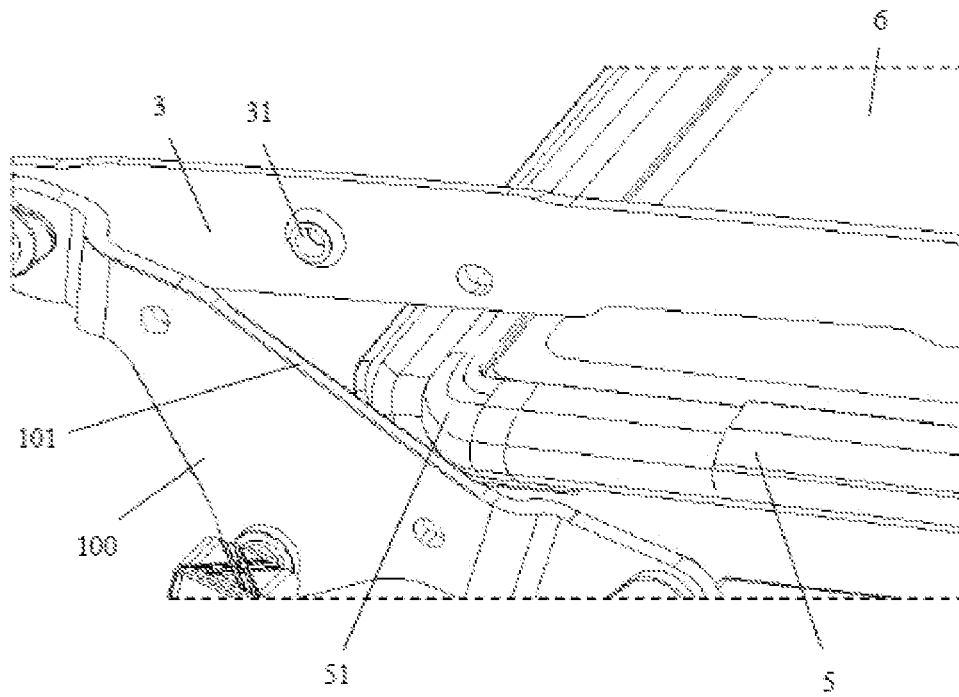
FIG. 2 is a partial schematic drawing of the sunroof linkage in FIG. 1 when in contact with a sealing strip of rear glass.
Figure 3:
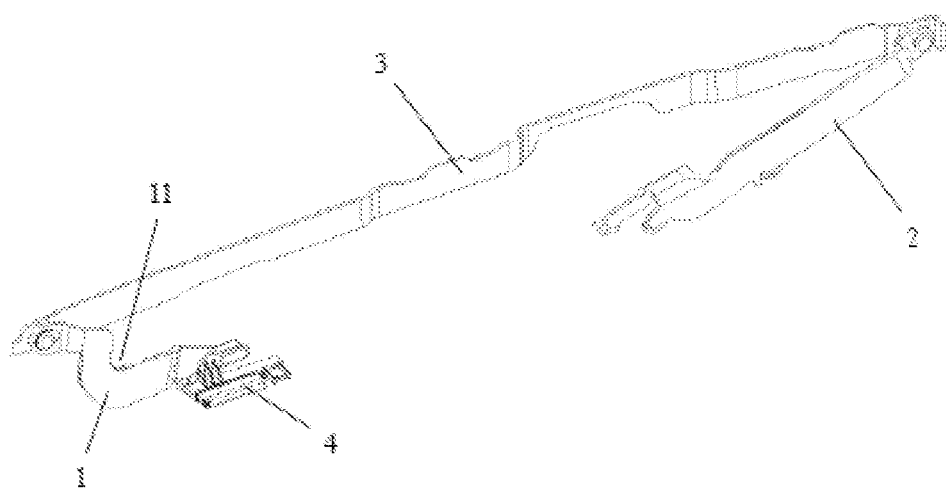
FIG. 3 is a partial schematic drawing of an embodiment of a sunroof linkage according to the present invention.
Figure 4:
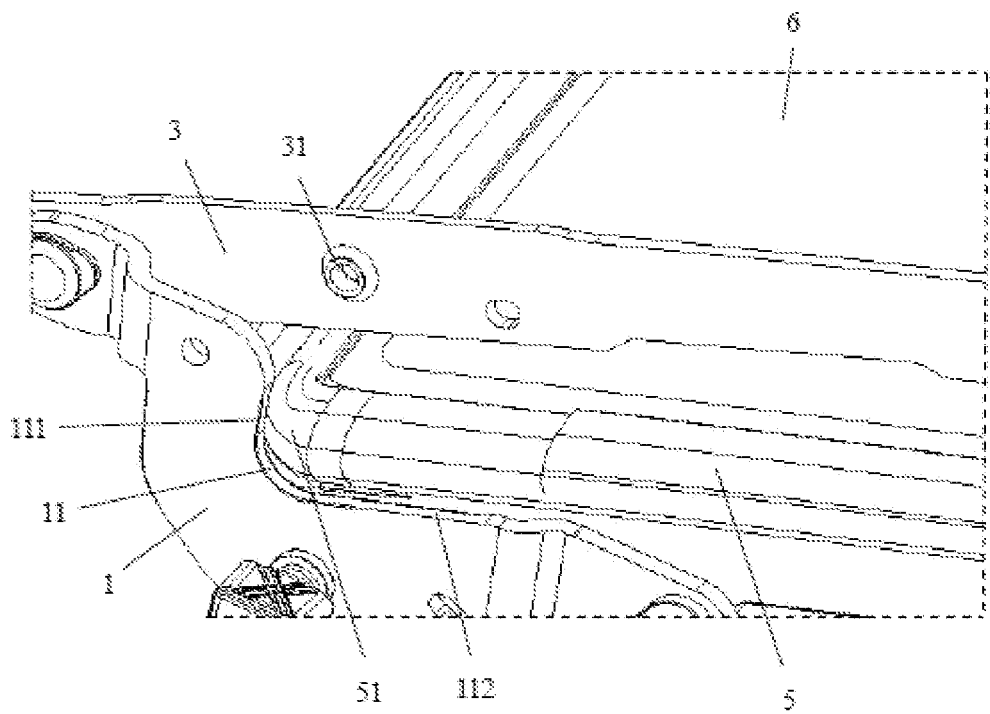
FIG. 4 is a partial schematic drawing of the sunroof linkage in FIG. 3 when in contact with a sealing strip of rear glass.

FIG. 3 is a partial schematic drawing of a preferred embodiment of a sunroof linkage according to the present invention; FIG. 4 is a partial schematic drawing of the sunroof linkage in FIG. 3 when in contact with a sealing strip 5 of rear glass 6. In fact, the sunroof linkage shown in FIGS. 3 and 4 is an improved solution proposed on the basis of the existing sunroof linkage shown in FIGS. 1 and 2; thus, parts which are the same in both can be understood by referring to the background art section herein, and are not described again here.

The improved feature of the present invention is that, in contrast to the front connecting rod 100 of the sunroof linkage in the prior art, the sunroof linkage according to the present invention comprises a novel front connecting rod 1 for connecting a front end of a glass-supporting rod 3 to a front slider 4; this front connecting rod 1 has an anti-turn-over structure matched in shape to the sealing strip 5. More specifically, due to this anti-turn-over structure, the sunroof linkage according to the present invention can drive front glass (not shown) to slide rearwards above the rear glass 6 until a front end of the front glass is flush with a front end of the rear glass 6 in the longitudinal direction of the vehicle (i.e. enables the sunroof to open to the maximum extent), and the sealing strip 5 of the rear glass will substantially not be pushed up by the front connecting rod 1 and thereby turned over and folded during the sliding of the linkage; thus, the sealing strip 5 will not produce abnormal noises caused by turning over and springing back, and has a longer service life. Specifically, the rear glass 6 may be securely installed at a rear part of the sunroof frame; or be configured to be inclinable relative to a motor vehicle body by a predetermined angle, i.e. can be tilted up.

Preferably, as shown in FIGS. 3 and 4, in contrast to the triangular front connecting rod 100 in the prior art, a recess 11 is formed on an edge of the front connecting rod 1 according to the present invention that faces the sealing strip 5 (i.e. an edge corresponding to the oblique edge 101 of the front connecting rod 100), to constitute the anti-turn-over structure of the front connecting rod 1. When the sunroof linkage slides to a position where the front connecting rod 100 comes into contact with a lateral front end 51 of the sealing strip 5, the presence of the recess 11 prevents significant positional interference of the front connecting rod 1 with the sealing strip 5; thus, the sealing strip 5 will substantially not be pushed up by the front connecting rod 1 and thereby turned over and folded.

More preferably, in order to obtain a better anti-turn-over effect, an included angle formed by a recessed edge of the recess 11 is less than or equal to 90°. For example, as shown in FIG. 4, the edge of the front connecting rod 1 that faces the sealing strip 5 comprises an upper edge 111 extending substantially in a vertical direction and a lower edge 112 extending substantially in a horizontal direction, so as to form the recess 11 having a substantially right-angled recessed edge. To facilitate processing, the right-angled included angle formed by the upper edge 111 and lower edge 112 is rounded to form a smooth transition. Of course, the included angle formed by the upper edge 111 and lower edge 112 may also be an acute angle, as long as strength requirements for the front connecting rod 1 and process feasibility are satisfied. According to another implementation variant, the included angle formed by the upper edge 111 and lower edge 112 may also be an obtuse angle slightly larger than a right angle, on condition that the recess 11 is able to achieve the anti-turn-over effect.

The technical content and technical characteristics of the present invention have been disclosed above. However, it will be understood that within the creative thinking of the present invention, those skilled in the art could make various changes and improvements to the concept disclosed above, but all such changes and improvements would fall within the protection scope of the present invention.

The description of the embodiments above is exemplary and non-limiting; the protection scope of the present invention is determined by the claims.

The invention claimed is:

1. A front connecting rod for a sunroof mechanical set,
    the sunroof mechanical set being configured to drive a front glass of a sunroof assembly to slide relative to a rear glass, and
    the front connecting rod being configured to connect a glass supporting rod of the sunroof mechanical set to a front slider,
    wherein the front connecting rod comprises an anti-turnover structure configured to contact and match the shape of a sealing strip provided on a peripheral edge of the rear glass, so as to prevent the sealing strip from turning over when the sunroof mechanical set drives the front glass to slide.

2. The front connecting rod for a sunroof mechanical set according to claim 1, wherein the anti-turnover structure is a concave portion formed on an edge of the front connecting rod facing the sealing strip.

3. The front connecting rod for a sunroof mechanical set according to claim 2, wherein the concave portion has a concave edge forming an angle less than or equal to 90°.

* * * * *